(12) United States Patent
Andersson

(10) Patent No.: US 6,817,181 B2
(45) Date of Patent: Nov. 16, 2004

(54) METHOD FOR OPERATING A HEAT-PRODUCING PLANT FOR BURNING CHLORINE-CONTAINING FUELS

(75) Inventor: Christer Andersson, Karlholmsbruk (SE)

(73) Assignee: Vattenfall AB (publ), Stockholm (SE)

( * ) Notice: Subject to any disclaimer, the term of this patent is extended or adjusted under 35 U.S.C. 154(b) by 0 days.

(21) Appl. No.: 10/250,946

(22) PCT Filed: Jan. 24, 2002

(86) PCT No.: PCT/SE02/00129

§ 371 (c)(1), (2), (4) Date: Jul. 26, 2003

(87) PCT Pub. No.: WO02/059526

PCT Pub. Date: Aug. 1, 2002

(65) Prior Publication Data

US 2004/0068988 A1 Apr. 15, 2004

(30) Foreign Application Priority Data

Jan. 26, 2001 (SE) .............................................. 0100220

(51) Int. Cl.[7] .............................................. F01K 25/08
(52) U.S. Cl. .............................. 60/651; 60/653; 60/671
(58) Field of Search ........................... 60/651, 653, 671, 60/673

(56) References Cited

U.S. PATENT DOCUMENTS

| | | | |
|---|---|---|---|
| 3,799,139 A | * | 3/1974 | Kuhn ........................ 123/188.9 |
| 4,043,768 A | | 8/1977 | Bennett et al. |
| 5,401,589 A | * | 3/1995 | Palmer et al. ................. 429/13 |
| 5,442,914 A | * | 8/1995 | Otsuka .......................... 60/527 |
| 5,943,865 A | * | 8/1999 | Cohen ............................ 60/653 |
| 6,032,468 A | * | 3/2000 | Fetescu et al. ................. 60/653 |

FOREIGN PATENT DOCUMENTS

| | | |
|---|---|---|
| DE | 198 49 022 | 4/2000 |
| DE | 199 03 510 | 8/2000 |

* cited by examiner

*Primary Examiner*—Hoang Nguyen
(74) *Attorney, Agent, or Firm*—Young & Thompson

(57) ABSTRACT

A method for operating a heat-producing plant having a chamber for burning chlorine-containing fuels and a channel connected with the chamber, in which a plurality of consecutive heat-transferring devices are located, which can heated by hot flue gas which flows through the channel in the direction from the combustion chamber towards an outlet. The flue gas is conditioned by addition of a sulphur-containing additive injected into the flue gas downstream a combustion zone and upstream that heat-transferring device being the first to be hit by the flue gas. Alkaline chlorides are sulphated thereby reducing chlorine-induced corrosion of the heat-transferring devices. As additive ammonium sulphate ($(NH_4)_2SO_4$), ammonium bisulphate ($(NH_4)HSO_4$), ferrous sulphate ($FeSO_4$), or sulphuric acid ($H_2SO_4$), is used, in order to form reactive sulphur trioxide ($SO_3$).

14 Claims, 4 Drawing Sheets

US 6,817,181 B2

Figure 1:
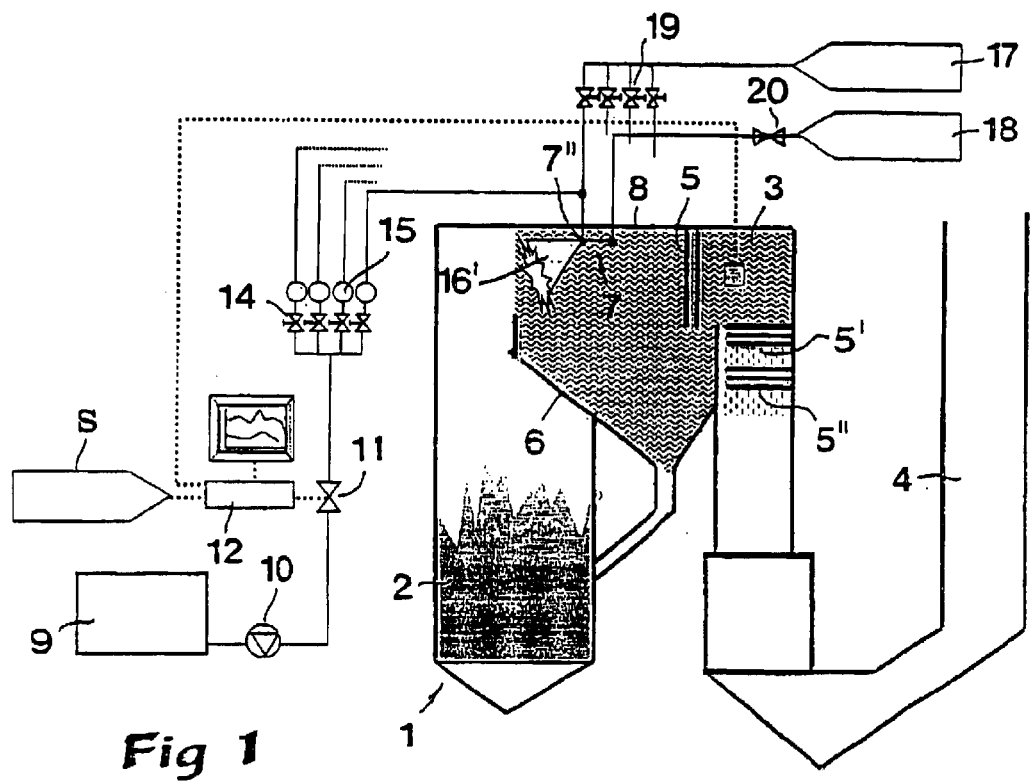

METHOD FOR OPERATING A HEAT-PRODUCING PLANT FOR BURNING CHLORINE-CONTAINING FUELS

TECHNICAL FIELD OF THE INVENTION

This invention relates to a method for operating a heat-producing plant of the type which comprises a chamber for burning chlorine-containing fuels and a channel connected with said chamber, in which a plurality of consecutive heat-transferring devices are located, through which fluids, such as steam, water or air may pass with the purpose of being heated by hot flue gas which flows through the channel in the direction from the combustion chamber towards an outlet, the flue gas being conditioned by addition of a sulphur-containing additive, which is injected into the flue-gas flow in a channel section located, on one hand downstream a combustion zone, in which substantially all fuel is burnt, and, on the other hand, upstream and at a distance from that heat-transferring device positioned downstream the combustion zone being the first to be hit by the flue gas, and which additive, after the entrance thereof in the flue-gas flow has the purpose of, during the way thereof to said first heat-transferring device, sulphating above all gaseous alkaline chlorides comprised in the flue gas, with the aim of reducing chlorine-induced corrosion on the heat-transferring devices.

PRIOR ART

By U.S. Pat. No. 4,043,768 is previously known how to add a sulphur-containing additive to the type of flue gas that is obtained by burning coal of a varying sulphur content. As preferred additives, finely powdered ammonium sulphate or ammonium bisulphate are mentioned, which should be inserted into the flue gas when the same has a temperature within the range of 590–900° C. The primary object of the addition of the sulphur-containing additive is to improve the efficiency of an electrostatic dust separator. Thus, what forms the basis of the technique being presented in U.S. Pat. No. 4,043,768 is the understanding that the dust separator works most efficiently in burning coal of a relatively high sulphur content (3–5% sulphur) as a consequence of said fuel providing a resistivity of the flue-gas particles of $10^8$–$10^{10}$ ohm cm, while coal of a low sulphur content (1%) provides a considerably higher resistivity ($10^{13}$ ohm cm) of the particles, and thereby a considerably lower precipitation capacity of dust separators. By adding suitable amounts of a sulphur-containing additive, the resistivity of the flue-gas particles can be optimised at burning of coal of a low sulphur content; all with the purpose of attaining a good dust separation. In the described plant, the dust separator is located immediately upstream the flue-gas outlet or chimney, but down stream a plurality of heat-transferring devices, such as a secondary superheater, a reheating superheater, a so-called "ball-room", a primary superheater, an economizer and an air preheater. In the preferred embodiment, which is described in U.S. Pat. No. 4,043,768, the sulphur-containing additive is inserted at a position upstream the dust separator, but downstream a number of heat-transferring devices. More precisely, it is preferred that the additive is injected into a section located between the inlet to said "ball-room" and the primary superheater, where the temperature is within the range of 900–550° C.

BACKGROUND OF THE INVENTION

Solid fuels in the form of bio and waste fuels are becoming an increasingly established energy source for combined power and heat production, among other things as a consequence of such fuels being long-term available and providing an energy-efficient combustion. The category of bio fuels includes, among other things, wood chips, bark, straw, sawdust, black liquor and the like, while waste fuels may, for instance, contain sorted domestic waste, industrial waste, demolition wood, sludge. Principally, waste fuels should be understood as such materials that already have been used for another purpose, while bio fuels are such plant materials that are utilised from the nature without other purposes than producing energy.

Since bio and waste fuels have been put into operation on a large scale, such fuels have, however, in several aspects proven considerably more difficult to burn than coal. Among other things, this is due to the fact that the ash of the bio and waste fuels has a different composition and different melting characteristics than the ash of coal. One of the most expensive problems is corrosion and ash deposits on the super heater tubes and other parts being comprised in the heat-transferring devices of the plants. Consequently, severe high-temperature corrosion has been detected in a large number of heat-producing plants after a few years of operating time with 100% bio fuels. At wood-fuel burning, the corrosion begins at steam temperatures in the superheater of approx. 480° C., and increases along with the temperature up to approx. 500–600° C. This equals the steam temperature of the hottest superheaters in modern combined power and heat plants. There is a trend in the industry to mix in demolition wood and sorted waste fractions in the fuel mixture, which may further accentuate the above-mentioned problems and extend the corrosion also to heat-transferring surfaces of lower material temperature. By those skilled in the art, chlorine is regarded as the principal corrosion accelerator. It is assumed that the chlorine is transported to the surface of the superheater tubes in the form of gaseous-phase alkaline chloride (at wood fuel mainly potassium chloride), alternatively as very small aerosols of alkaline chloride having condensed just upstream the superheater. On the tube surface, reactions between the alkaline chlorides and, for instance, ferrous oxide take place while forming free chlorine, which in this form is highly corrosive. The exact mechanism for the corrosion is not entirely clarified, but it is beyond all doubt that chlorine plays a central role.

By those skilled in the art, the relation of sulphur/chlorine or the S/Cl ratio of the fuel has been proposed as a parameter indicating the risk of chlorine-induced high-temperature corrosion. It is previously known that addition of sulphur to the fuel reduces chlorine-induced corrosion at waste burning. It has been assumed that an S/Cl ratio higher than 4 would be sufficient in order for the superheater corrosion to become acceptably low. Wood fuels have, however, an S/Cl ratio within the range of 1–2, and unsorted domestic waste approx. 0,2–1.

Also fuels of a relatively high S/Cl ratio may give rise to problems related to alkaline chlorides, viz. if they are burnt under conditions which mean that a major share of the sulphur is bound in the form of sulphate compounds already in the burning process. Such conditions prevail, for instance, at the burning of coal in a fluidized bed at addition of lime-stone, dolomite or other compounds that form basic oxides in the combustion chamber with the purpose of decreasing the emission of $SO_2$. Especially at a relatively high dosage or the presence of the sulphur-binding additive, in order to meet stricter environmental requirements, chlorine corrosion has occurred on superheater surfaces situated downstream the combustion zone.

The hypothesis concerning the ability of sulphur to decrease the chlorine content of the superheater deposits is that the alkaline chlorides of the flue gas is converted into alkaline sulphate before they reach the superheater according to the following sum formula:

$$2KCl + SO_2 + \tfrac{1}{2}O_2 + H_2O \leftrightharpoons K_2SO_4 + 2HCl \qquad (1)$$

the equilibrium of which is displaced to the right at flue-gas temperatures below approx. 800° C.

Test measurements have shown that a fairly high concentration of $SO_2$ is required in the flue gas in order for KCl to be significantly reduced in flue-gas temperatures at about 700–900° C., which equals the temperature range within which the superheaters in the most common types of boilers operate. For instance, measurements at burning wood chips have shown that an $SO_2$ content corresponding to approx. 50–150 mg S/per MegaJoule (MJ) fuel is required in the flue gas in order to achieve a 50% reduction of the potassium-chloride content in the flue gas ahead the superheaters. This equals an S/Cl mole ratio in the flue gas of approx. 3–10. The increase of the sulphur-dioxide content in the flue gas entails negative consequences in the form of increased $SO_2$ emissions from the plant (problems with emission regulations and environmental permits) and an increased risk of low-temperature corrosion. The reason for such a large $SO_2$ redundancy being required is that the reaction (1) is kinetically limited at the flue-gas temperature in question, and has therefore no time to reach equilibrium before the chloride encounters the superheater.

The reaction (1) is an overall reaction including a plurality of substeps. An important substep is considered to be:

$$SO_2 + O(+M) \leftrightharpoons SO_3(+M) \qquad (2)$$

where M is a catalyst for the oxidation. The sulphur trioxide formed will further react with the alkaline chlorides according to the formula:

$$2KCl + SO_3 + H_2O \leftrightharpoons K_2SO_4 + 2HCl \qquad (3)$$

M may, for instance, be ferrous oxide. The equilibrium of the reaction (2) moves to the right at decreasing temperature. At temperatures of about 700° C., the content of $SO_2$ and $SO_3$, respectively, is equally large at equilibrium (depending on the sulphur content and oxygen content). In absence of the catalyst M, reaction (2) is slow at temperatures below 900° C. In flue gas, normally the concentration of M is low in relation to the gaseous phase reactants oxygen and sulphur dioxide. As a consequence, just a minor part of the sulphur dioxide has time to oxidise to sulphur trioxide before the flue gases leave the plant. This has been verified by measurements of the $SO_3$ content in flue gas at approx. 150° C., which indicates that only approx. 1–3% of the total sulphur-oxide content in gaseous phase is present as $SO_3$.

Addition of sulphur at the burning may be effected in different ways. The most commonly used method is co-burning a fuel of a low S/Cl ratio (e.g. bio fuel) with a fuel of a higher sulphur content, for instance commonly used coal types or peat. However, measurements have shown that the share of coal or peat has to be relatively large (20–50%) in order to achieve a pronounced reduction of the flow of alkaline chlorides to the superheater. Such a large admixture of fossil fuel is not always consistent with the external and internal environmental requirements of the energy producer, and usually neither economically advantageous. Furthermore, many combustion plants lack fuel-handling systems adapted to handle a plurality of fuel flows. In connection with future economical control means for reduction of $CO_2$ emission, co-burning with a large share of coal can be expected to become clearly unprofitable in comparison with pure bio- or waste-fuel combustion. Furthermore, bio and waste fuels, as well as most fuels rich in sulphur, are inhomogeneous in respect of, among other things, the sulphur content. This implies that different mixture ratios of the fuels are required at different times in order to maintain a sufficiently high S/Cl ratio, without the sulphur emission becoming high. Since the delays and buffer volumes of the fuel handling systems generally are considerable (a representative feed hopper may house fuel for approx. 1 hour of operation), it is evident that, in terms of control engineering, it will become very difficult to maintain optimum fuel ratios at varying sulphur and chlorine content in the fuel flows.

Another theoretically feasible method to supply sulphur is dosing elementary sulphur in the form of granule or powder directly into the fuel flow immediately before the fuel is fed into the boiler.

Irrespective of method of supplying sulphur to the fuel before the combustion according to the above, the emission of $SO_2$ will increase considerably.

OBJECTS AND FEATURES OF THE INVENTION

The present invention aims generally at obviating, or at least considerably abating, the problems that are associated with chlorine-induced corrosion on the superheaters or heat-transferring devices being comprised in heat-producing plants of the type in question. Therefore, a primary object of the invention in a first aspect is to provide an operation method, according to which the content of alkaline chlorides in the flue gas is reduced to a minimum before the flue gas hits the first one of the various heat-transferring devices, which are located in the flue-gas channel between the combustion chamber and the outlet of the plant, without giving rise to significantly increased $SO_2$ emissions to the environment because of this. An additional object is to achieve the desired reduction of the alkaline-chloride content of the flue gas by means of sulphur quantities that are considerably lower than the quantities required in the sulphation methods described above.

According to the invention, at least the primary object is attained by the features defined in the characterizing clause of claim 1. Preferred embodiments of the method according to the invention are furthermore defined in the dependent claims.

Further Elucidation of Prior Art

By DE 19849022 is previously known, according to the way initially mentioned, how to dose a sulphur-containing chemical into the flue gas downstream a combustion zone and upstream a set of heat exchangers, with the purpose of reducing chlorine-induced corrosion on the heat exchangers. The originator of the method according to this patent publication has, however, not realised the benefits of primarily adding $SO_3$, rather than $SO_2$. Thus, the dosing of additive in the known method is adjusted on the basis of measured $SO_2$ content in the flue-gas channel, and when the $SO_2$ content is below a certain limit value, the dosing is started so that the $SO_2$ content is increased above the limit value. As the only example of a sulphating additive, $MgSO_4$ is mentioned, which at injection into the flue gas forms $SO_2$, all measurements and adjustments of the flue gas taking place on the basis of $SO_2$.

Contrary to the method according to DE 19849022, the present invention is based on the idea of primarily adding $SO_3$ solely, which—without slow oxidation of $SO_2$—reacts very fast and efficiently with present alkaline chlorides while forming alkaline sulphate, which is considerably more harmless in respects of corrosion. Thereby, no surplus of $SO_2$ is required to achieve a sufficient sulphating reaction. In other words, unnecessary $SO_2$ emissions are avoided. Furthermore, according to the invention the flow of $SO_3$ may quickly be adjusted to an altered boiler load and/or flue-gas composition so that an optimum S/Cl ratio is continuously maintained in the flue gas upstream all the superheaters or heat producing devices under varying burning conditions.

DETAILED DESCRIPTION OF THE METHOD ACCORDING TO THE INVENTION

The method according to the invention is based on the idea of injecting an alkaline chloride-reducing substance or additive into the plant in an area or channel section which is located downstream the combustion zone in which substantially all fuel is burnt (>90% should be burnt in said zone), as well as upstream and at a distance from that heat-transferring device being the first to be hit by the flue gas. Contrary to this, in U.S. Pat. No. 4,043,768, supply of a sulphur-containing additive is recommended at a point located downstream a plurality of the heat-transferring devices comprised in the plant, which for this simple reason are subjected to chloric-induced corrosion. Furthermore, the additive should, in connection with the entry thereof in the flue-gas flow, in all essentials consist of a reactive sulphur trioxide ($SO_3$), which is added in a quantity of at least 20 mg $S/m^3n$ (normal cubic meter) flue gas. The flue-gas temperature is usually within the range of 600–1200° C. in the section in question of the combustion plant. The substance that is injected may be of varying forms, but is henceforth generally denominated "additive". Characteristic of the additive should, however, be that it generates $SO_3$ at heating to the temperatures being at hand in the dosing area. According to the invention, for this purpose a compound is selected from the group: ammonium sulphate ($(NH_4)_2SO_4$), ammonium bisulphate ($(NH_4)HSO_4$) and ferrous sulphate ($FeSO_4$). Said salts are easily soluble in water and may advantageously be injected as an aqueous solution, e.g. an aqueous solution of 25% (percentage by weight) of an ammonium sulphate. A feasible liquid additive consists of sulphuric acid ($H_2SO_4$) of varying concentration.

By the injection taking place at a distance from the first heat-transferring device, the reactive sulphur trioxide has during the way thereof to said device time to sulphate gaseous alkaline chlorides in particular, so the same are reduced to a minimum before the flue-gas flow reaches said first heat-transferring device.

The liquid additives are suitably dosed by means of nozzles (see "Dosing Equipment" below). It is also feasible to inject $SO_3$-forming additives of solid phase (particular form) in the boiler by means of, for instance, an air or flue-gas flow. This can suitably be realised by using a lance for the dosing of additive (see "Dosing Equipment" below). An additional possibility to achieve the desired effect according to the invention is to generate $SO_3$ gas outside the proper boiler and lead the $SO_3$-enriched gas into the flue gas in the specified section of the flue-gas channel. This may be achieved, for instance, by heating/boiling of sulphuric acid. Another method is to initially generate $SO_2$, for instance by burning sulphur in furnace, and then lead the $SO_2$ gas over a vanadium catalyst, where it is converted to $SO_3$. Whether the heating of the $SO_3$-generating substance takes place outside the boiler, inside the flue gas, or inside some kind of lance located in the flue-gas channel, is of incidental importance for the carrying out of the invention.

Advantages of the Invention

An advantage of injecting substances which directly form $SO_3$, without taking the way round the slow oxidation of $SO_2$, is the fact that $SO_3$ reacts very fast and efficiently with the present alkaline chlorides while forming alkaline sulphate, which is considerably more harmless in respects of corrosion. Thereby, no surplus of $SO_2$ is required to achieve the sulphating reaction, and thereby unnecessary $SO_2$ emissions are avoided. Furthermore, the sulphur consumption may be limited, partly thanks to the more efficient reaction path mentioned above, partly by the adding of $SO_3$ being made behind the proper combustion zone, where the share of sulphur which is bound to the basic oxides of the fuel ash or to de-sulphating products such as limestone or dolomite is minimal. The flow of the $SO_3$ additive according to the invention may be quickly adjusted according to altered boiler load and/or flue-gas composition so that an optimum S/Cl ratio is continuously maintained in the flue gas upstream all the superheaters or heat-transferring devices under varying burning conditions, e.g. as a consequence of variations in the fuels.

Optimum Temperature Interval

The reason for the fact that no major quantity of $SO_3$ is converted to $SO_2$ at high temperatures, for instance close to 1000° C., where the thermodynamic equilibrium is moved towards $SO_2$, is that the kinetics of the reaction (2) according to the above is slow (which is valid in both directions). The rate of the reaction (2) increases with increased flue-gas temperature. When the gas temperature at the injection point rises above, for instance, 1000° C., the conversion of $SO_3$ to $SO_2$ is, therefore, considerably increased, the efficiency of the method according to the invention decreasing. Therefore, the advantageous temperature interval of injection or supply of the $SO_3$-generating substance is 600–1000° C. At temperatures below 600° C., the content of alkaline chlorides in a gaseous phase is very low because the dew point of the chloride gas is not exceeded. In that connection, the alkaline chloride condenses and forms very small (5–100 nm) aerosols in the flue gas. Also the sulphur trioxide sulphates a certain share of said alkaline chloride aerosols in those cases they are formed, but laboratory experiments have shown that the sulphating of alkaline chlorides takes place considerably faster in a gaseous phase than in a condensed phase. Therefore, it is advantageous to perform the dosing of the additive in an area where the major part of the alkaline chloride is in a gaseous form, i.e., at a certain distance downstream the first heat-transferring device, but downstream the proper combustion zone.

Selection and Adjustment, Respectively, of Optimum Quantity of Additive

The dosing of additive should in each application and operation method, respectively, be continuously adjusted to the flue-gas flow in question as well as the alkaline-chloride content in the flue gas. The flue-gas flow may be calculated on the basis of the producing effect of the boiler as well as the moisture content and elementary composition of the fuel, or be measured by methods known by those skilled in the art. The alkaline-chloride content in the flue gas may advantageously be measured with the technique that is described in the SE patent 9903656-B, or approximately calculated on the basis of information about the fuel's chlorine content. Other factors that affect the choice of additive flow are, for instance, the sulphur content of the fuel, as well as the flue-gas temperature in the section of the flue-gas channel where the additive is introduced. The sulphur content of the fuel is initially oxidised to sulphur dioxide, and then said sulphur dioxide can sulphate alkaline chloride in the flue gas. However, only a small share of the fuel sulphur contributes to the sulphation of alkaline chlorides before the flue gases hit the superheater. Too low an additive flow results in a limited effect on the chlorine corrosion, while too high a flow implies an unnecessarily high additive consumption as well as an increased risk of corrosion and deposit formation on the low-temperature heat exchanger of the plant, for instance, the air preheater, which operates at material temperatures within the range of 80–200° C.

It is not necessary to entirely eliminate the alkaline chloride in the flue gas in order to avoid chlorine corrosion.

A reduction of the concentration by about 50–80% is often sufficient in order to achieve a considerably milder corrosion. The required degree of reduction depends on fuel composition, operation conditions, superheater materials, steam temperature etc., and should be determined from case to case.

Theoretically, according to the reaction (3) above, 0,5 mole $SO_3$ should be sufficient to sulphate 1 mole alkaline chloride. Practical measurements in combustion plants indicate, however, that an addition of additive equivalent to a mole ratio of $SO_3/[KCl+NaCl]$ within the range of 0,75–2,0 is required to obtain a chloride reduction of 75%. Here, the expression $[KCl+NaCl]$ represents the number of moles of potassium chloride plus the number of moles of sodium chloride per cubic meter gas in the flue gases exactly upstream that channel section in which the dosing of additive takes place. For wood fuel of an presumed chlorine content of 0,027 percentage by weight, this corresponds to a sulphur addition of approx. 10–28 mg S/MJ fuel or approx. 0,18–0,49 g S/kg (total solids content TS) fuel. By calculating the specific amount of flue gas that arises at burning wood fuels according to this example, the above-mentioned dosing of additive provides an increment of sulphur in the flue gas equivalent to 24–63 mg S/$m^3$n wet flue gas. For fuels containing a higher, in comparison with chlorine, amount of alkali being volatile at burning, for instance wood fuels, the approximate calculation of the demand of additive is relatively simple, since the absolutely predominant part of the chlorine content will be present as alkaline chloride in the flue gas when the same enters the channel section where the dosing of additive takes place. For fuels of a higher chlorine/alkali ratio, for instance certain waste fuels, a certain part of the chlorine content of the fuel will form hydrochloric acid (HCl) directly in the combustion zone, which needs to be taken into consideration at approximate calculation of a suitable quantity of additive.

The reason why a higher $SO_3/[KCl+NaCl]$ mole ratio is required in practice in comparison with the theory is that $SO_3$, besides the alkaline chlorides, also reacts with other alkaline compounds in the flue gas and that a small share of the $SO_3$ is reduced to $SO_2$, where the latter in principle is inactive for reaction with the alkaline chlorides. In all events, the quantity of sulphur, which is required to attain a certain reduction of the alkaline-chloride content in flue gas, is considerably less at injection of $SO_3$-generating additive into the flue gas in comparison with sulphur addition to the fuel.

The procedure of determining the optimum flow of $SO_3$ additive in a given application is as follows. The additive is dosed proportionally to the fuel flow according to the formula (4) below;

Additive flow [g sulphur/hour]=fuel flow [kg TS/hour]×K    (4)

The formula (4) calculates which flow of sulphur being required in order to achieve a certain reduction of chloride. When the type of sulphur compound that is used for generating the $SO_3$ gas is known, subsequently the flow of the sulphate compound can easily be calculated. Examples concerning ammonium sulphate are shown below. The fuel flow can be calculated on the basis of the current, produced thermal effect and the total efficiency of the boiler, or measured directly by established methods. K is a parameter that varies with the chlorine content, sulphur content and alkaline content of the fuel, as well as factors specific to the plant. For instance, the parameter K may amount to ≈0,28 g sulphur/kg (TS) fuel at burning wood fuels. At such an addition of additive, a reduction of 70–80% of the alkaline-chloride content in the flue gas can be expected, which is sufficient to slow down the corrosion rate on the superheater radically. If ammonium sulphate is used as an $SO_3$-generating additive, the flow mentioned above equals approx. 1,13 gram ammonium sulphate/kg (TS) fuel or 157 mg ammonium sulphate/$m^3$n flue gas.

Representative indicative values of the parameter K for other solid fuels are shown below.

| | |
|---|---|
| Domestic waste: | 1–3 g S/kg TS |
| Recycled wood: | 0.7 |
| Brown coal (rich in chlorine, 1.5% Cl): | 0.8 |
| Peat: | 0.15 |

It should be observed that all fuel types are most often inhomogeneous. Large variations may be present both in regards of chlorine content as well as other characteristics, which implies that the optimum additive flow may need adjustment in each individual application. The adjustment may be effected on one single occasion or intermittently in those cases when a fuel of a relatively homogeneous quality is used. In cases when the quality of the fuel varies to a higher degree (when, for instance, waste fuels or a mixture of different types of bio fuels are used), continuous measurement in the flue gas should be made, at the same time as the dosing of additive is adjusted. The methods available to campaign-wise trim an optimum additive flow, or more precisely to tune the parameter K according to the relation (5), is shown below.

The necessary additive flow in order to achieve the desired reduction of the alkaline-chloride content in the flue gas may be examined with the following methods:

1) Direct in-situ measurement of the alkaline-chloride content in the flue gas in the area of the first superheater, preferably by means of the measurement method being described in SE 9903656-8. The adjustment of the additive flow is not limited by the response time of the measurement, but rather by the resetting time for the respective flow level.
2) Campaign measurement of composition and growth of the ash deposit which is formed on a temperature-controlled probe being exposed to flue gas in connection with the superheater. Such a campaign measurement does, however, usually demand 3–12 hours in order to obtain useful results.
3) Corrosion measurement with a temperature-controlled probe being exposed to flue gas in connection with the superheater. Such a measurement does usually demand 1–12 weeks in order to obtain useful results. Therefore, this is in practice very time-consuming and impractical.
4) On-line measurement of superheater corrosion using modern probe methods based on electrochemistry. The method has, however, a response time of approx. 1–12 hours in of response time subsequent to a gradual alteration of the flue-gas chemistry before reliable measurement results are obtained.

5) Measurement of HCl (the reaction product in the sulphation reaction [1]), either in the area around the first superheater or later on in the flue-gas zone. When the HCl content no longer increases with increased dosing of additive, it may be presumed that in principle all available alkaline chloride in the flue gas has been sulphated.

The above-mentioned methods 1–5 (preferably method 1) may be used to check the quantity of additive that is required to obtain the desired result. However, by said methods it is difficult to check that overdosage does not occur, with an increased risk of negative and expensive side effects. Such side effects may consist of corrosion and deposit formation on the low-temperature heat exchangers of the plant. In order to check the tendency of overdosage, the following methods may be applied:

6) $SO_3$ measurement in the flue gas downstream the area where the additive is dosed, by means of methods known to those skilled in the art.
7) Measurement of the acid dew point of the flue gas by means of commercially available measurement equipment.
8) Measurement of corrosion and deposit formation using a probe, in principle according to methods 3) or 4), but in this case in the low-temperature section of the plant, where the flue gases have assumed a temperature of about 100–200° C.

Dosing Equipment

An important factor in order to achieve the intended reduction of alkaline chloride is that the $SO_3$-generating additive is injected into the flue gas in such a way that a good mixing of $SO_3$ and the metal chlorides of the flue gas is achieved before the gas mixture hits the first superheater. More precisely, said dosing needs to be performed in such a way that the concentration ratio between $SO_3$ and metal chloride is almost constant over a cross-section of the flue-gas channel before the flue gas hits the first superheater. If the injection should be effected in such a way that, for instance, the $SO_3$ additive does not penetrate into the centre of the flue-gas channel, but is distributed to the non-central areas of the channel, chlorine corrosion will still be take place on the central portions of the superheater, while sulphur-related corrosion may appear on the parts of the superheater which are exposed to relatively high contents of $SO_3$. To achieve an optimum intermixing of the additive in the flue gas is in practice made difficult by the fact that the flue-gas flow and the concentration of alkaline chlorides, respectively, is practically never entirely evenly distributed spatially across the cross-section of the flue-gas channel into which the additive is introduced. Depending on the design and the operation of the combustion plant, marked channelling may be found in the flue gas between the combustion zone and the superheaters.

In order to achieve the best possible spreading and distribution of the additive across the cross-section of the flue gas, wall-mounted nozzles or transverse lances can advantageously be used. A third alternative is to utilise some form of mixing device being located between the injection point and the superheater. Said mixing device may in practice consist of one or more cyclones, which is standard equipment in the commonly used boiler technique CFB (Circulating Fluidized Bed)

In order to attain the above-mentioned requirement of a homogenous concentration distribution of $SO_3$ across the cross-section of the flue gas, the flow profile of the flue gas as well as the concentration profile of metal chlorides need to be mapped. This, in order to ascertain how the additive flow should be distributed over the same cross-section. It can be assumed that the alkaline chloride concentration accompanies some fuel specific component in the flue gas, for instance carbon dioxide. Mapping of the gas flow and carbon dioxide content across the cross-section of the flue gas can be carried out by measurement in full scale by methods known to those skilled in the art, by modelling in physical scale models or by mathematical modelling (so-called CFD). When the spatial flow distribution of alkaline chloride is mapped, a suitable dosing device is dimensioned and adjusted according to the above (nozzles or lance), so that the additive is added in proportion to the local chloride flow in each part of the cross-section of the flue gas. The result may be controlled by mapping the concentration distribution of a tracer component in the cross-section of the flue gas downstream the injection point, which component is added in the $SO_3$ additive and which is possible to measure. If for instance an ammonium-sulphate solution is used, ammonia (which is formed when the ammonium sulphate is heated) can be used as a tracer component.

The number, dimensioning, and location of the nozzles should be carefully chosen in each individual application. Normally, at least two nozzles should be used. Liquid additives have in this regard obvious advantages over additives of gaseous phase or solid phase by the forming of drops in the nozzles, which easily may be ejected several meters counter-flow into the flue gas. If for instance a 25% ammonium sulphate-solution is injected, the liquid flow will be so small in relation to the flue-gas flow that it may be necessary to add dilution water to the sulphate solution before the solution is pumped into the nozzles. This, in order to achieve a sufficient drop size and penetration depth in the flue-gas channel. In the most common commercial nozzles, compressed air is also added in order to control drop size, distribution angle and ejection length.

BRIEF DESCRIPTION OF THE APPENDED DRAWINGS

Figure 2:
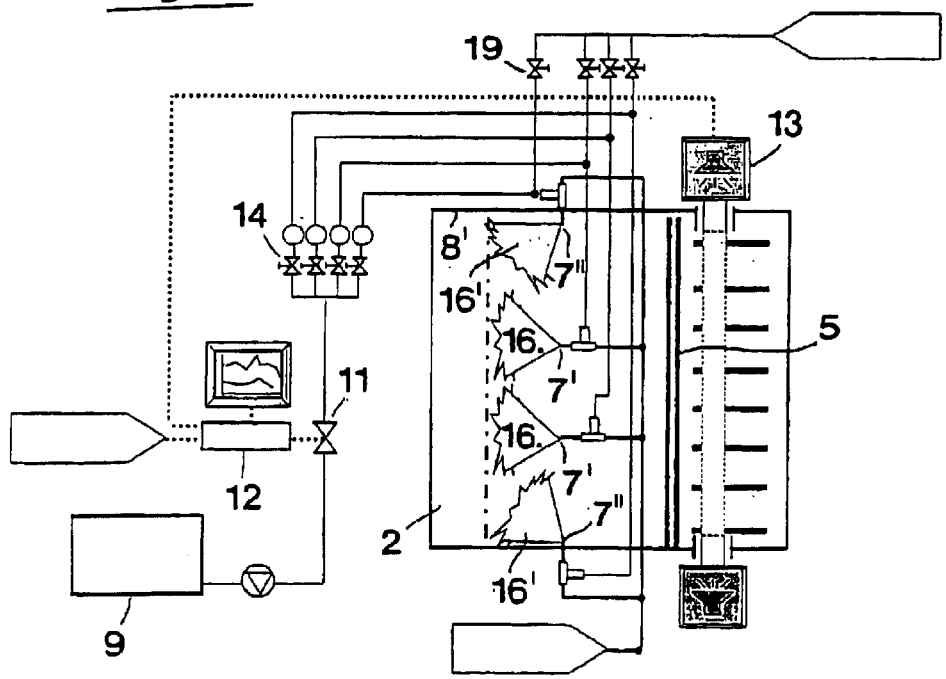
Figure 3:
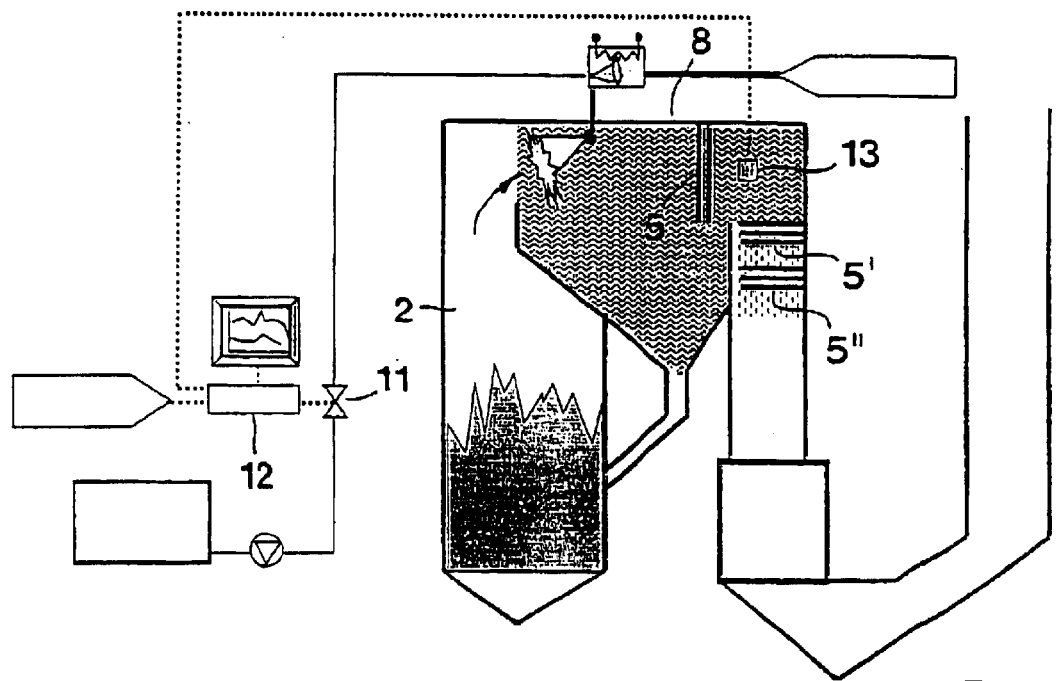
Figure 4:
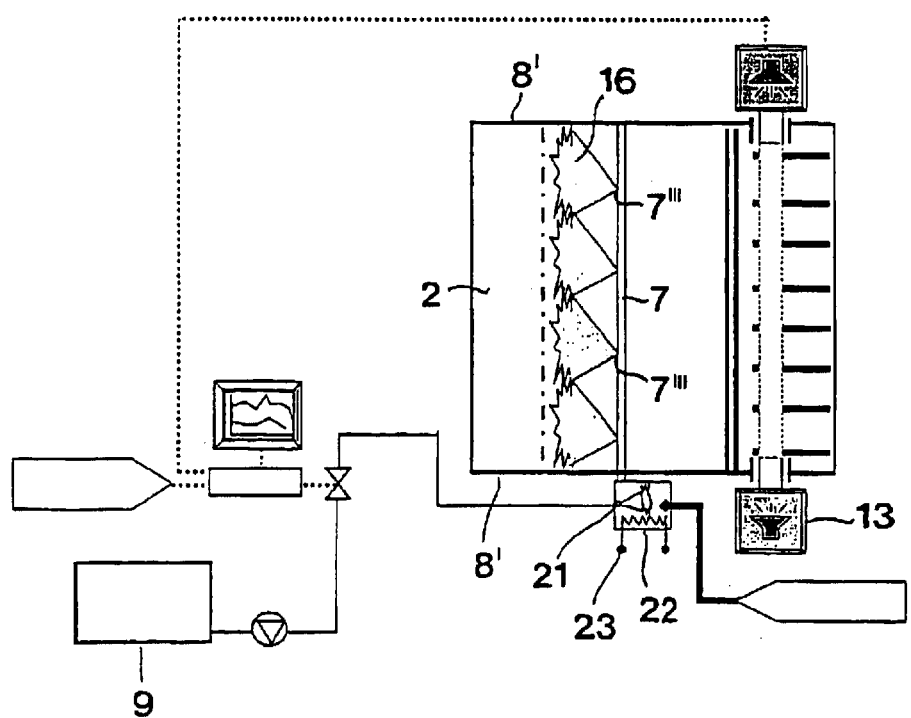
Figure 5:
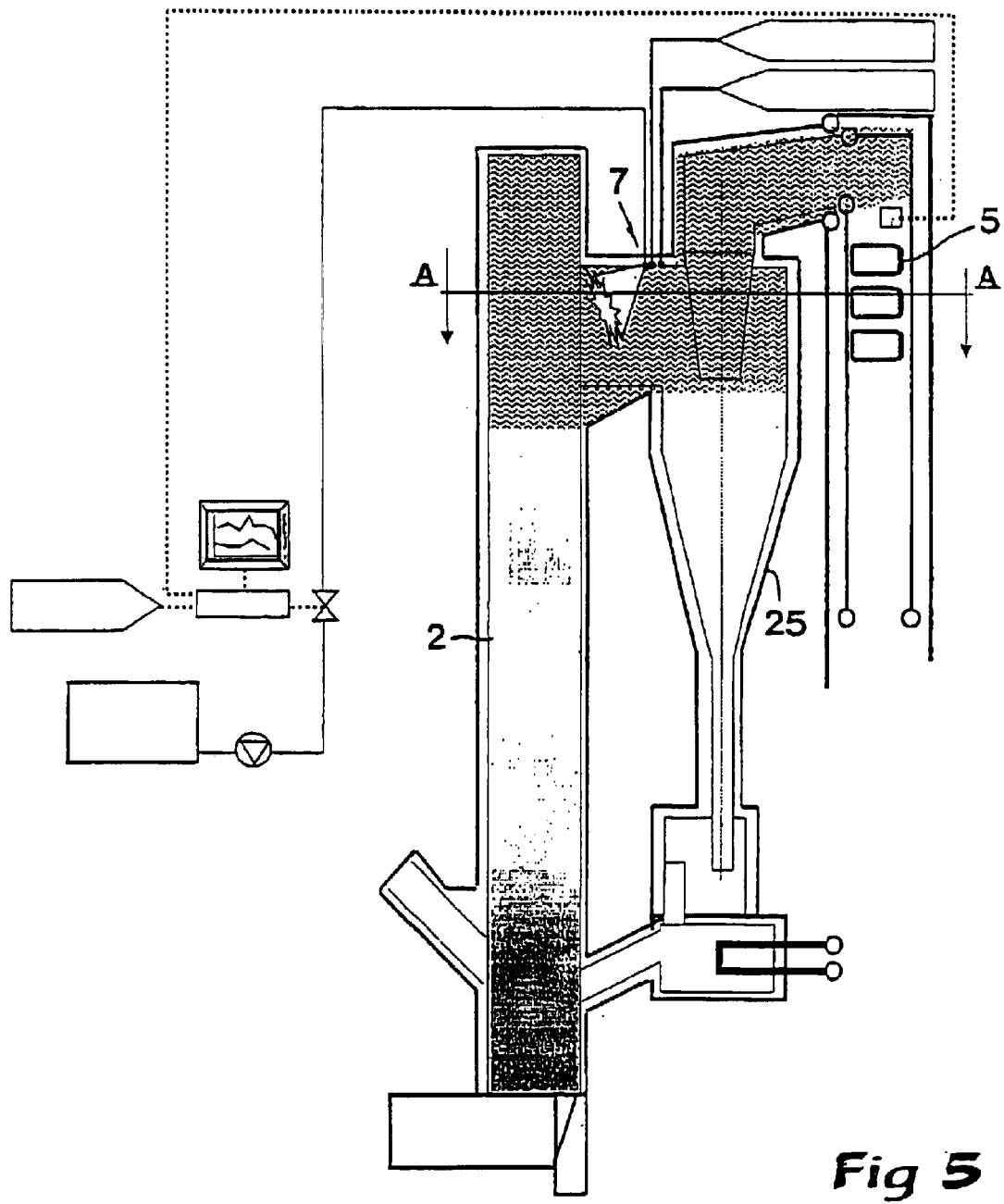
Figure 6:
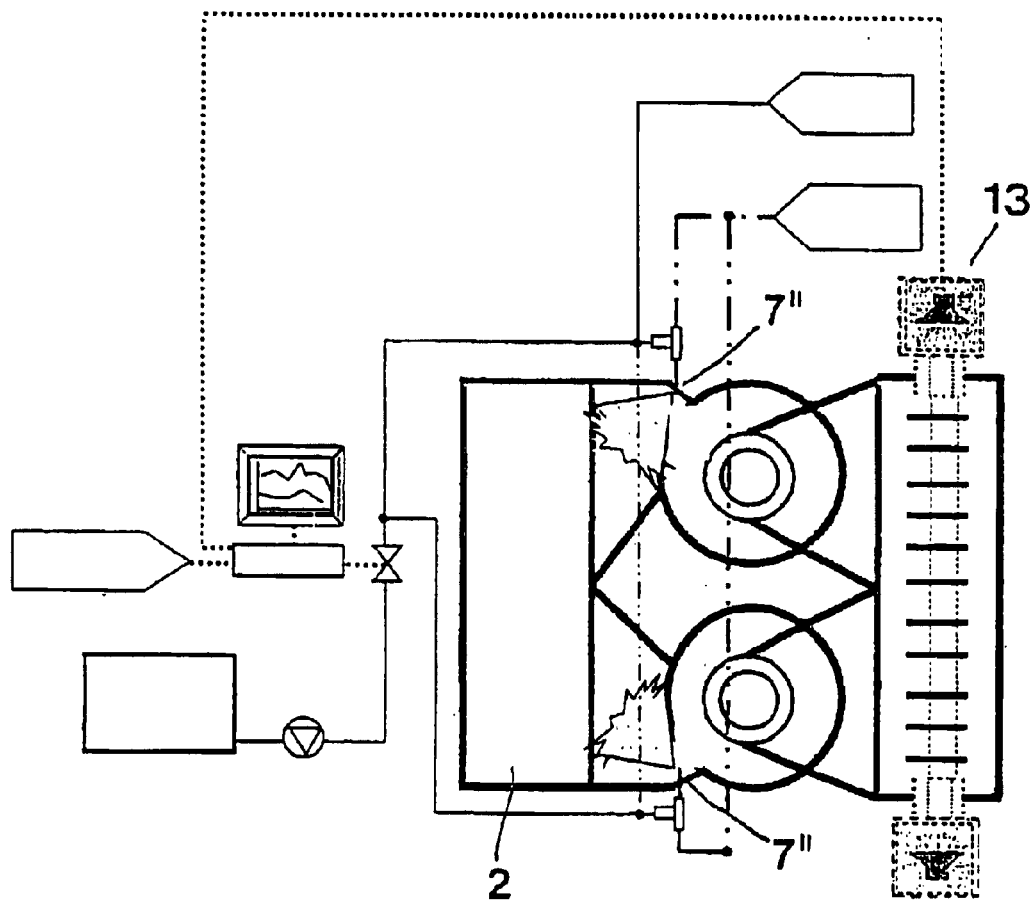

In the drawings:

FIG. 1 is a schematic side view showing the general structure of a heat-producing plant together with equipment for dosing of additive, FIG. 2 is a schematic planar view of the same plant together with dosing equipment, FIG. 3 is a side view corresponding to FIG. 1 showing a plant with alternative equipment for dosing of additive, FIG. 4 is a planar view showing the same plant together with dosing equipment as in FIG. 3, FIG. 5 is a schematic side view showing an alternative plant, and FIG. 6 is a schematic planar view of the plant according to FIG. 5.

DETAILED DESCRIPTION OF PREFERRED EMBODIMENTS OF THE PLANT ACCORDING TO THE INVENTION

FIGS. 1 and 2 show a combustion plant, which may consist of an industrial steam boiler having the essential purpose of generating steam, e.g. for production of electricity, but which also may consist of a combined power and heating plant. The plant comprises a boiler 1 having a combustion chamber 2, from which a flue-gas channel generally designated 3 extend, which ends in an outlet in the form of a chimney 4. The boiler 1, which may be of a height within the range of 10–40 meters, may work with conventional fluidized-bed technique (BFB). In the flue-gas channel 3, a plurality of consecutive heat-transferring devices are arranged, through which fluids, such as steam, water or air, may pass with the purpose of being heated by the passing, hot flue gas. In FIG. 5, said devices are exemplified in the form of three superheaters 5, 5', 5". Each such super-heater comprises a set of pipes or pipe coils through which steam may pass with the purpose of being overheated by heat transfer from the flue gas. Between the combustion chamber 2 and the flue-gas channel 3, an inclined wall 6 extends, comprised in a separator with the purpose of collecting solid particles coming down from the flue gases and bringing these back to the combustion chamber. When the flue gas has passed the superheaters 5, 5', 5", said gas is cooled in one or more so-called economizers (not shown), and passes an air preheater (not shown) in order to finally be discharged through the chimney 4 (usually after first having passed one or more not shown electrostatic filters).

According to the invention, a device for injection of additive into the flue gas, in its entirety designated 7, is located downstream the combustion chamber 2. In the shown embodiment, said injection device 7 comprises a plurality of, more precisely four, nozzles 7', 7", which all are placed near a channel-delimiting top wall 8. The injection device 7 is, as is apparent from FIGS. 1 and 2, placed upstream and at a distance from that superheater 5 being the first to be hit by the flue gas. The distance between the injection device 7 and the first superheater 5 should amount to at least 0,75 m and preferably 2 m or more.

In addition to the injection device 7, the equipment for dosing of additive also comprises a tank 9, which serves as a source of additive. From the tank 9 may, for instance, 25% ammonium-sulphate solution be pumped by means of a pump 10 to a regulating device 11, which regulates the total quantity of additive which should be dosed to the boiler. In practice, the regulating device 11 may consist of a pneumatically or electrically controlled valve in combination with a flow meter for liquid. A separate control unit 12 calculates suitable additive flow based on an analogous signal S, which corresponds to the boiler load such as this is calculated by the control system of the boiler as well as the alkaline-chloride content in the flue gas. Said alkaline-chloride content is measured by means of a measurement device 13, which advantageously may be made in the way which has been described in SE 9903656-8. The control unit 12 may in practice consist of a computer. The calculation of the optimum additive flow is performed according to the principles, which have been accounted for above. Downstream the regulating device 11, the additive flow is divided into a number of partial flows via branch conduits having valves 14, which individually can adjust the size of the different partial flows up to the nozzles 7', 7". The flows in respective branch conduit may be read on flow indicators 15.

Two of the four nozzles which together form the injection device 7, namely the nozzles 7', are placed in a central area of the channel and axially directed to inject two plumes of additive essentially axially into the channel, more precisely counter-flow the flue-gas flow. In other words, the nozzles are directed backwards towards the inlet of the flue gas into the channel. The other two nozzles 7" are placed laterally, more precisely near two channel-delimiting side walls 8'. The nozzles 7" are constituted in a way so that they inject plumes 16' of additive obliquely backwards towards the flue-gas flow. The plumes 16, 16' of additive, which are inclined in direction downwards from the top wall 8, should be so large that they tangent or somewhat overlap each other. Thus, the outflow of additive encounters the out-flowing flue gas and is essentially evenly mixed with the same. In order to control the drop size, ejection length and scattering angle of the nozzles independently of the quantity of additive, dilution water from a dilution-water source 17 may be added to the nozzles together with compressed air from a compressed-air source 18. The flows of dilution water and compressed air are adjustable by means of valves 19 and 20, respectively.

From the above is seen that the supply of the partial flows of additive via the different nozzles can be regulated individually. In this way, optimum quantities of additive can be added even if strip formations are found in the flue-gas flow.

It may be pointed out that the temperature of the flue gas in the injection device, i.e. upstream the first superheater 5, normally is within the range of 600–1000° C.

The result of the dosing of additive, i.e. the reduction of the alkaline-chloride content in the flue gas, is measured in situ by means of the measurement device 13, which is advantageously placed directly downstream the first superheater 5.

In FIGS. 3 and 4, an alternative embodiment of the equipment for dosing of additive is shown. Instead of individual nozzles, in this case a so-called lance is used, having the form of a pipe 7 that is placed near the top wall 8 and extends between the side walls 8'. The spray elements consist of jets or holes 7''', which are axially spaced-apart along the pipe in order to effect spraying of counter-flow directed plumes 16 of additive, bordering each other. Suitably the holes 7''' are equidistantly spaced-apart. Via the lance or the pipe, additive that not solely can be gaseous or liquid but also of solid, particular form, can be injected. In the example, the injection device was assumed to use a 25% aqueous solution of ammonium sulphate, which is atomized in a nozzle 21 in a chamber 22, through which air or flue-gas flows. The temperature in the chamber 22 is kept at approximately 150° C. by supply of heat via a radiator 23. It is also feasible to use preheated air or flue gas. The heat in the chamber 22 entails that the water in the sulphate solution evaporates, at the same time as the ammonium sulphate forms very small, solid particles which are driven by a gas flow inside the lance and is distributed in the arriving flue gas via the jets or holes 7'''.

In this context, it may be pointed out that more than one lance may be mounted in the flue-gas channel.

In FIGS. 5 and 6, a so-called CFB boiler is exemplified, which utilises an available cyclone 25 for mixing of plumes 16 of additive, supplied via nozzles 7", with the flue gas.

Accomplished experiments have shown that the formation of $SO_3$ only becomes efficient if the concentration of coal monoxide (CO) in the flue gas, where the additive is injected, is moderate, more precisely below 500 ppm. If the CO content increases over said limit, in relation to $SO_3$ the share of formed $SO_2$ increases in an undesirable way. The concentration of CO is dependent of the burning in so far that the CO content becomes lower the more the fuel has been burnt out. For said reason, it is important that the injection of the additive is effected in a suitable place between, on one hand, the combustion zone (where 90% of the fuel has been burnt), and on the other hand the first superheater. In practice, the injection should be effected at a point that is distanced from the combustion zone by at least 25%, suitably 50%, of the distance between the combustion zone and the first superheater.

Further Advantages of the Invention

In cases when the fuel contains heavy metals such as zinc and lead (elements of frequent occurrence in for instance waste fuels), in parallel to the alkaline chlorides, zinc chloride and lead chloride, respectively, may be formed in the flue gas. Said heavy metal chlorides have a higher vapour pressure than the alkaline chlorides and may be present entirely in gaseous phase also in flue-gas temperatures under 600° C. Zinc chlorides and lead chlorides have properties which resemble the properties of alkaline chlorides in so far that they are often enriched on the pipes of the superheater and accelerates corrosion of the same. Deposits which contain considerable shares of heavy metal do frequently attack also superheaters which are operated at low steam temperatures, for instance 380–480° C. This is assumed to be effected by the fact that the heavy metal chlorides form low-melting-point compounds, with for instance alkaline chlorides in the ash deposits of the pipes of the superheater. Adding of sulphur trioxide upstream the pipes of the superheater according to the invention, will also sulphate the heavy metal chlorides, which entails a significant reduction of the corrosion rate in those applications and temperature intervals where the heavy metals play a significant role for the corrosion attacks.

An additional advantage of the invention is that the use of ammonium sulphate or ammonium bisulphate in order to generate $SO_3$ at the same time entails a marked reduction of $NO_x$ if the dosing is performed within the temperature interval of 800–950° C. By mixing ammonium-sulphate solution and ammonia solution in different proportions, an optimum reduction of alkaline chloride as well as an optimum reduction of $NO_x$ may be maintained under varying flue-gas conditions.

The addition of $SO_3$-generating additive to the flue gas may also have following advantages:

1) The emissions of dioxin from the plant may be decreased through sulphating of catalytic ash substances in the flue gas, such as copper oxides.
2) In cases when the combustion plant uses so-called SCR-catalyst for purification of $NO_x$, the adding of $SO_3$ may contribute to reducing de-activation of the catalyst (i.e. poisoning of the active centre of the catalyst, which results in degraded purification ability). De-activation of catalysts is especially problematic at burning of fuels rich in alkaline, such as bio and waste fuels.
3) Calcium oxide ('quicklime') in the fly ash may be sulphated to calcium sulphate, which provides a more easily handled ash that has better properties as regards utilisation for road constructions etc. Quicklime in the fly gas may otherwise constitute a considerable problem as a consequence of intense generation of heat at moistening.
4) Calcium oxide may also build up hard deposits in the colder devices of the plant (200–600° C.), for instance, in the economizer. If the calcium oxide is sulphated before it reaches said devices, the risk of deposit formations is reduced.

In conclusion it should be pointed out that certain types of heat-producing plants may include heat-transferring devices which are placed in that combustion zone where burning of the fuel still takes place. The combustion zone is defined by the area in the boiler where at least 90% of the fuel is burnt out. The first heat-transferring device being hit by the flue gas according to the definition in subsequent claims consists of a heat-transferring device that is distanced from the proper combustion zone. In this connection, it may also be mentioned that the distance between the combustion zone and said first heat-transferring device may be considerably greater than a few meters, e.g. 10–50 meters. According to the invention, the dosing of additive should be performed at a greatest possible distance from the first heat-transferring device, because of this without the additive being dosed in the proper combustion zone.

What is claimed is:

1. Method for operating a heat-producing plant of the type which comprises a chamber (2) for burning chlorine-containing fuels and a channel (3) connected with said chamber, in which a plurality of consecutive heat-transferring devices (5, 5', 5") are located, through which fluids, including steam, water or air may pass with the purpose of being heated by hot flue gas which flows through the channel in the direction from the combustion chamber (2) towards an outlet (4), the flue gas being conditioned by addition of a sulphur-containing additive, which is injected into the flue-gas flow in a channel section located, on one hand downstream a combustion zone and, on the other hand, upstream and at a distance from that heat-transferring device (5) positioned downstream the combustion zone being the first to be hit by the flue gas, and which additive, after the entrance thereof in the flue-gas flow has the purpose of, during the way thereof to said first heat-transferring device, sulphating above all gaseous alkaline chlorides comprised in the flue gas, with the aim of reducing chlorine-induced corrosion on the heat-transferring devices characterized in that a compound chosen from the group: ammonium sulphate ((NH4)2SO4), ammonium bisulphate ((NH4)HSO4), ferrous sulphate (FeSO4), and sulphuric acid (H2SO4), is used as additive, in order to form reactive sulphur trioxide (SO3) at the occasion of entrance, which is injected in a quantity of at least 20 mg S/m3n flue gas, at a point distanced from the combustion zone, where at least 90% of the fuel is burnt out, where the temperature of the flue gas is within the range of 1000 to 600° C.

2. Method according to claim 1, characterized in that the additive is added in a quantity of at least 35 mg S/m3n flue gas.

3. Method according to claim 1, characterized in that the additive is injected into the flue-gas flow at a plurality of spaced-apart points (7', 7", 7'") with the purpose of attaining an optimum sulphation of the alkaline chlorides.

4. Method according to claim 3, characterized in that the additive is distributed substantially evenly in the cross-section of the channel (3), more precisely by forming spray plumes (16, 16') bordering each other.

5. Method according to claim 1, characterized in that the additive is injected counter-flow the flow direction of the flue gas.

6. Method according to claim 1, characterized in that the additive is injected in a liquid state, more precisely in the form of drops which are gasified by the flue gas during formation of said sulphur trioxide.

7. Method according to claim 1, characterized in that the additive is added to the flue gas in a quantity corresponding to a mole ratio SO3/[KCl+NaCl] of 0.5–3.0.

8. Method according to claim 3, characterized in that the addition of the additive to the various injection points (7', 7", 7'") is regulated individually.

9. Method according to claim 2, characterized in that the additive is injected into the flue-gas flow at a plurality of spaced-apart points (7', 7", 7'") with the purpose of attaining an optimum sulphation of the alkaline chlorides.

10. Method according to claim 4, characterized in that the addition of the additive to the various injection points (7', 7", 7''') is regulated individually.

11. Method according to claim 5, characterized in that the addition of the additive to the various injection points (7', 7", 7''') is regulated individually.

12. Method according to claim 6, characterized in that the addition of the additive to the various injection points (7', 7", 7''') is regulated individually.

13. Method according to claim 7, characterized in that the addition of the additive to the various injection points (7', 7", 7''') is regulated individually.

14. Method according to claim 1, characterized in that the additive is added to the flue gas in a quantity corresponding to a mole ratio SO3/[KCl+NaCl] of 0.75–2.0.

* * * * *